(No Model.)

G. B. GRANT.
GEAR CUTTING MACHINE.

No. 398,506. Patented Feb. 26, 1889.

Witnesses:
Geo. C. Wheeler
L. A. Wheeler

Inventor
Geo. B. Grant

UNITED STATES PATENT OFFICE.

GEORGE B. GRANT, OF MAPLEWOOD, MASSACHUSETTS.

GEAR-CUTTING MACHINE.

SPECIFICATION forming part of Letters Patent No. 398,506, dated February 26, 1889.

Application filed August 2, 1886. Serial No. 209,813. (No model.)

*To all whom it may concern:*

Be it known that I, GEORGE B. GRANT, of Lexington, in the county of Middlesex and State of Massachusetts, have invented certain new and useful Improvements in Machines for Cutting the Teeth of Elliptic Spur-Gears, of which the following is a specification.

My invention relates to machines for cutting the teeth of elliptic spur-gears; and it consists of apparatus, first, to hold the gear-blank to be cut by means of a shaft or mandrel through its focus-hole, and to accurately place that focus with respect to the center of the ellipse; second, to so space the rotary motion of the blank that the teeth cut in its edge shall follow the true elliptic outline, and, third, to so divide the rotary motion of the blank that the teeth cut in it shall be accurately spaced on its pitch-line.

Figure 1:
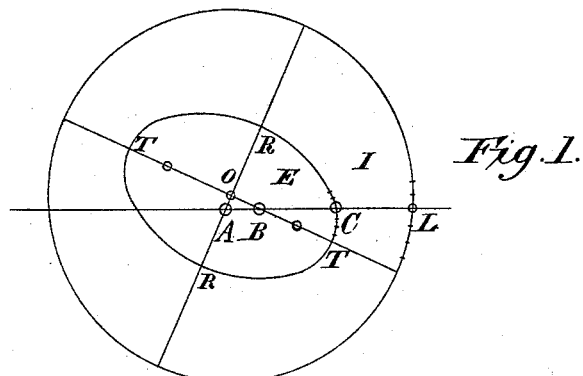
Figure 2:
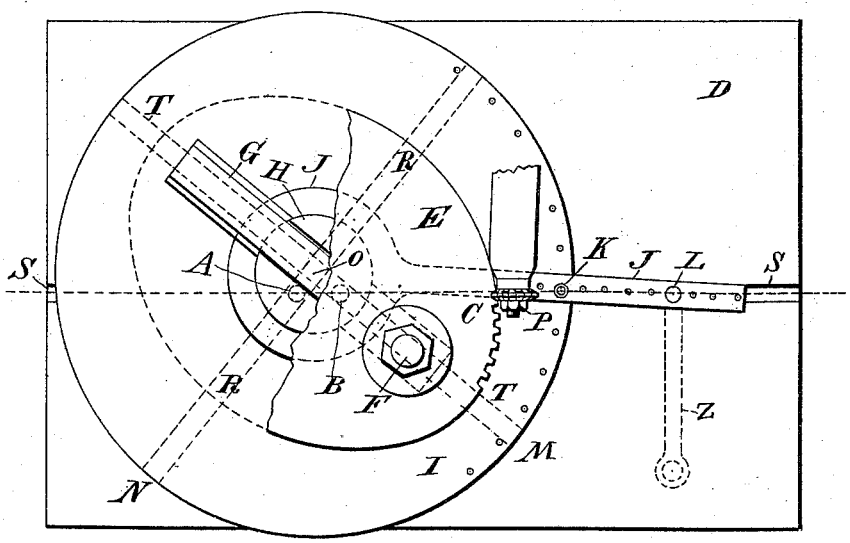
Figure 3:
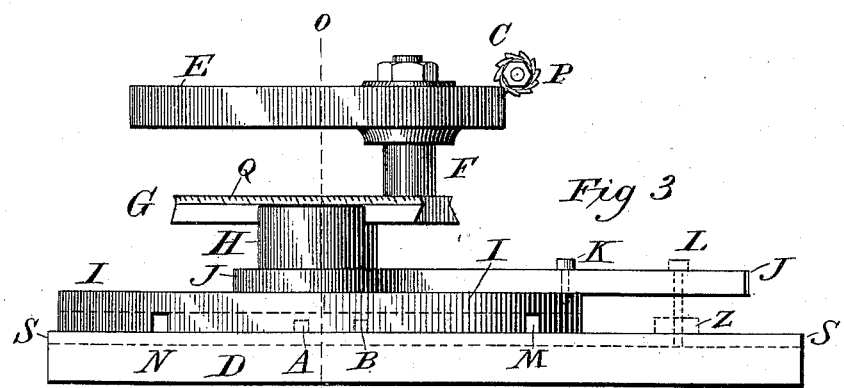

Figure 1 is a diagram illustrating the mathematical principles upon which the operation of the machine is based. Fig. 2 is a plan, and Fig. 3 is an elevation, showing all the parts of the machine.

In the diagram, Fig. 1, RR and TT are two lines crossing each other, preferably at a right angle, at the center point, O, and fixed upon a plane that revolves as a whole upon the plane of the drawing, upon which the three points A, B, and C are fixed, preferably in the same straight line.

It is a well-known fact that the point C will trace out a true ellipse upon the moving plane if the two lines are compelled to move on the points A and B. It is a property of the ellipse, discovered by myself, that the line ABC extended will evenly divide both the ellipse and a circle, I, having the same center, O, and moving with the ellipse if its radius is equal to the sum of the radii of the ellipse. Therefore if a circle, I, accurately spaced, is attached to the moving plane, as shown, it will serve as an index to space the ellipse. This spacing is not mathematically exact, but its accuracy for cases in actual use is well within the requirements of practice. As an example, take an elliptic gear of eight diametral pitch, having radii of five and four inches and seventy-two teeth. An index-circle of nine inches radius will space this gear so accurately that the maximum error—the difference between the largest and smallest spaces—is less than one three-hundredth of an inch.

The lines RR and TT are preferably at right angles, and the pins A, B, and C are preferably in line, as shown; but that arrangement is not essential. Lines at any angle and points in any relative position will produce the true ellipse; but the disposition chosen gives the advantages that the major and minor of the ellipse will coincide with the generating-lines, and that the major and minor radii will be equal, respectively, to the distances of the points A and B from the tracing-point C. Any other disposition would trace an ellipse which could not be easily measured and placed.

The principles illustrated by the diagram are carried into practice by the apparatus shown by Figs. 2 and 3.

The platen D is the platen of a common gear cutting or milling machine or is a similar bed provided for the purpose, and it has a slot, SS. The cutter P is adjustably fixed with respect to the platen, so that it can be placed directly over the slot and can be moved vertically, so that the center point of its tooth outline can be fed in the vertical cutter-line CC. Two pins, A and B, are fixed in the slot SS at any desired distance apart in the line of the point C and at any desired distance from it. The head H lies upon and is rotatable upon the platen D, and on its under surface has two slots, M and N, at right angles to each other at the point O, and fitting the pins A and B. This head is placed on the platen, and as it is turned around the pins will slide in the slots and so guide its motion that any fixed point, as the point C, will trace out an ellipse upon it, which has the point O of the crossing of the two slots for its center and the distances AC and BC for its major and minor radii.

The gear-blank to be cut, E, can be held on the head H by any convenient means with its center at the center line, OO, of the machine; but as an elliptic gear is always held in use, not by its center hole, but by its focus-hole, it is more convenient to use a special device by which it can be readily mounted at its focus. The slide G slides in guides on the head H parallel to the slot M, and the stud F is so placed on the slide that it will always be over the center line of the slot and can be made to coincide with the common center, O.

In mounting the gear-blank to be cut a shaft-hole is bored at its focus, and it is fastened to the slide G upon the stud F. The slide is then placed, by means of the scale Q, so that the center of the stud is at the known focal distance of the ellipse from the center O. The major axis TT of the ellipse is placed parallel with the slot M, and it is then in position to be cut.

The mathematical requirement for correct spacing is that the radius of the index shall be equal to the sum of the radii of the ellipse; but as that would require a separate index for each separate-sized gear to be cut the following equivalent device is used instead:

The index-plate I, fixed to and forming part of the head H, is of any convenient size, and is provided with the usual rows of index-holes or the equivalent worm or gear. The arm J swings freely on the head H about the center line, OO, and carries two pins, K and L, adjustably fixed upon it. The stop-pin K can be fixed to act in any row of holes, and the index-pin L, which can be fixed at any desired distance from the center O, projects downward and slides in the slot SS. As the head H is rotated, it has a swinging motion on the platen, the center O having a motion in a circle having a center on the line AB midway between the pins A and B; but the pin L will slide in the slot SS, giving the index a practical working radius, OL, which is variable at will while it is divided at any convenient radius, OK.

The machine is operated in the following manner: The gear-blank E, of known radii, focal distance, and number of teeth, is placed upon the head H in the manner described. The pins A and B are fixed at a distance apart equal to the difference of the radii of the ellipse, and the cutter is placed at a distance, BC, equal to the minor radius. The first tooth is then cut by feeding the cutter across the face of the blank. The index is then turned at the pin K through one tooth-space and the second tooth is cut. Similarly all the teeth are cut, and in the same way the points of the teeth are trimmed to the proper length. The three parts of this machine are practically distinct and perform separate parts of the work, although they combine to produce a single result. The form of neither one is dependent on the form of either of the others. The sliding blank-holder and the index will work just as well with any description of elliptic head as with one having the system of slots and pins here adopted, and, similarly, the blank-holder and the elliptic head can be combined with an index that is irregularly spaced to produce the regular spacing of the gear-wheel.

The only requirement for the swinging motion of the pin L is that it shall swing practically in a straight line, and that is best produced by the slot SS, as shown; but if the pin is attached to a vibrating lever, Z, as shown by the dotted lines, it will act properly, as its motion out of the straight line would then be but little.

The requirement as to the radius of the index need not be strictly adhered to, as it can be materially varied without materially affecting the accuracy of the spacing.

I claim the following combinations of parts in a machine for cutting the teeth of elliptic spur-gears:

1. The combination of the elliptic head H with the blank-holder G, adjustable in a direction parallel to the major axis of the ellipse, substantially as described.

2. The combination of the elliptic head H with the blank-holder G, adjustable in a direction parallel to the major axis of the ellipse, and the stud F, fixed on the center line of the holder, substantially as described.

3. The combination of the elliptic head H with the slide G, adjustable in straight guides on the head, substantially as described.

4. The combination of the elliptic head H with the slide G, adjustable in straight guides on the head, and the stud F, in the center line of the holder, substantially as described.

5. The combination of the fixed platen D, the fixed cutter P, with the rotatable elliptic head H, the index I, for spacing the rotary motion of the head, and the index-pin L, confined to move in a straight line with respect to the platen, substantially as described.

6. The combination of the fixed platen D, the fixed cutter P, the rotatable elliptic head H, and the index I on the head, with the two pins A and B on the platen and the two slots M and N on the head, substantially as described.

7. The combination of the fixed platen D, the rotatable elliptic head H, the index I, the pins A and B, and the slots M and N, with the index-pin L and the fixed slot SS in the line of the pins, substantially as described.

8. The combination of the platen D, the rotatable head H, the index I, the arm J, the stop-pin K, the index-pin L, and the slot SS, substantially as described.

9. The combination of the platen D, the rotatable elliptic head H, the pins A and B, the slots M and N, the arm J, the index I, the stop-pin K, the index-pin L, and the slot SS, in the line of the pins A and B, substantially as described.

GEO. B. GRANT.

Witnesses:
S. A. WHEELER,
I. C. WHEELER.